United States Patent [19]

Gray

[11] 3,709,146

[45] Jan. 9, 1973

[54] SHEET CONVEYOR AND PRINTER WHICH OUTSTACKS AND PRINTS SELECTED SHEETS

[75] Inventor: Colin Gray, London, England

[73] Assignee: Crosfield Business Machines Limited, London, England

[22] Filed: June 8, 1970

[21] Appl. No.: 44,106

[30] Foreign Application Priority Data

June 10, 1969 Great Britain....................29,298/69

[52] U.S. Cl.....................................101/317, 271/46

[51] Int. Cl...............................B41f 1/06, B65h 5/24

[58] Field of Search ..........101/2, 93, 317; 271/3, 74, 271/51, 80, 46, 56; 209/74

[56] References Cited

UNITED STATES PATENTS

| | | | |
|---|---|---|---|
| 3,578,159 | 5/1971 | Lindquist et al | 209/74 |
| 3,537,704 | 11/1970 | Bond | 271/74 |
| 3,370,844 | 2/1968 | Roberts | 271/3 |
| 3,485,488 | 12/1969 | Ellison | 271/3 |
| 3,373,685 | 3/1968 | Adams | 101/2 X |
| 2,912,925 | 11/1959 | Rabinow | 101/2 |
| 3,170,139 | 2/1965 | Rabinow | 101/93 R |
| 3,070,204 | 12/1962 | Bradshaw | 101/2 X |

OTHER PUBLICATIONS

IBM Technical Disclosure Bulletin, C. S. Jackonski "-Card Feed Mechanism," Vol. 3, No. 10, March 1961, p. 24.

*Primary Examiner*—Robert E. Pulfrey
*Assistant Examiner*—E. M. Coven
*Attorney*—Kemon, Palmer & Estabrook

[57] ABSTRACT

The invention relates to sheet feeding apparatus in which documents are fed one by one past a read head by a vented rotating vacuum drum. A selected document is separated from the arrival stack of documents without loosing the original sequence by applying a braking force to the document before it reaches its final position in the second stack. The document is therefore brought to rest in its allotted position within the original sequence but with its trailing edge protruding from the second stack.

7 Claims, 3 Drawing Figures

INVENTOR
Colin Gray
BY
Kenyon, Palmer + Estabrook
ATTORNEY

INVENTOR
Colin Gray
BY
Kemon, Palmer + Estabrook
ATTORNEY

SHEET CONVEYOR AND PRINTER WHICH OUTSTACKS AND PRINTS SELECTED SHEETS

In the field of document processing, it is often required to transfer a stack of documents one by one past a reading head to form a second stack. The information read from the documents may then be recorded or processed by other equipment. For example, the documents could be checks, the information then being processed by a computer to up-date accounts.

It sometimes happens that correct reading is impossible. For example, the information on the document may be badly marked, insufficient, or excessive. The document has then to be rejected and this in turn necessitates interrupting the operation to identify and remove, or distinguish, the offending document. Since the speed of these processes can be all important, this delay is obviously a serious handicap. A possible way of preventing the delay is to divert the rejected documents into a separate stacker. This not only increases the expense and bulk of the equipment, but the position of the documents within the original stack is lost. In some applications, the maintenance of the original sequence is essential.

According to the present invention a sheet feeder in which documents from a first stack are moved one by one past a read head to a second stack includes a braking device operative to apply a braking force to a selected document before it reaches its final position in the second stack such that the selected document is brought to rest in its allotted position within the original sequence but with its trailing edge protruding from the second stack.

The braking device may operate in response to a signal supplied directly from the read logic, or indirectly from an external source such as a computer. The selected document is thereby distinguished without having to stop the feed, and may comprise, for example, a reject, a transaction document above a certain value, or a document containing digits known to be associated with forgeries.

The apparatus may include further means for marking the selected document before the arrival of the next document at the second stack.

In a preferred embodiment of the invention the documents are forwarded from one stack to the other by a vented rotating vacuum drum, a document being held against the surface of the drum by suction until the leading edge strikes a stripping member which guides the document into the second stack. The braking device then comprises a vacuum brake positioned to restrain movement of the selected document just after it is picked up by the stripping member such that complete delivery of the document into the stack is prevented.

One example of the invention will now be described with reference to the accompanying drawing, in which.

Figure 1:
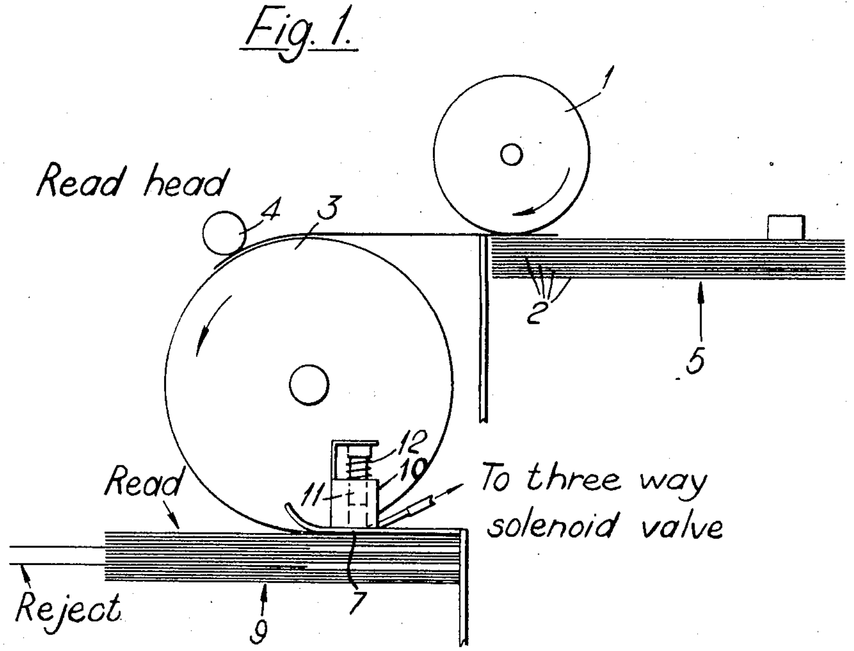
FIG. 1 is a plan view of a single pocket reading transport mechanism.
Figure 2:
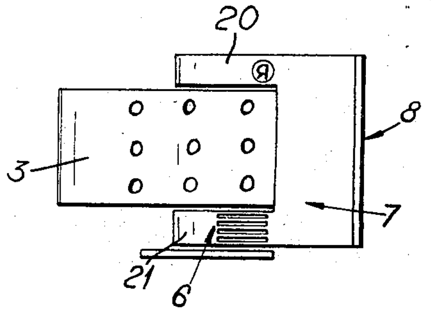
FIG. 2 is a front elevation view of the mechanism shown in FIG. 1.

Referring to FIGS. 1 and 2, rotation of the vacuum wheel 1 forwards the top sheet in the stack 5 of sheets 2 toward the ported vacuum drum 3. The drum picks up the sheet and forwards it past the reading head 4. The depth of the drum is such that the document extends above and below the top and bottom edges of the drum and hence the bottom portion of the document passes over the vacuum braking grooves 6 (FIG. 2) just after the document is peeled away from the surface of the drum by the inwardly curved leading portions 20 and 21 of the stripper plate 7. Alternatively the drum may include two flanges and the stripper plate is then positioned between the flanges. This arrangement is usable on a greater range of document heights without excessive overhang of the document above the drum.

The brake is operated in response to a signal from a three-way solenoid valve (not shown) having one port connected to a vacuum, a second port connected to a positive pressure line, and a third port connected to the braking grooves. The third port is switched from the positive pressure line to the vacuum in response to a signal from the read head indicating that the document being fed forward is to be rejected. The reject signal may simply indicate that the information on the document is badly marked, insufficient or excessive, but, alternatively, it might indicate that the document contains digits known to be associated with forgeries, or that a transaction document lies above a certain value. A selected document therefore passes over the braking grooves when the braking grooves are connected to the vacuum such that the document is prevented from reaching the stop plate 8 and will protrude about 1 to 2 inches from the arrival stack 9. The purpose of applying positive pressure to the braking grooves in the absence of a reject signal from the read head is that this releases the braking action more quickly and reduces the friction between the stripper and a non-selected document. This helps to ensure that non-selected documents reach the stop plate 8. It also reduces any tendency the leading end of the entering document may have to carry forward the previously out-stacked document.

In some applications, it sometimes occurs that a document stacks badly because it or the preceding document is mutilated and it therefore projects from the stack although it has not been rejected. In these applications to distinguish between these "false" rejects and the true rejects, the true rejects are automatically marked. The mark can for example be made by a porous plastic self-inking stamp 11 sliding in a hole in block 10 and normally held clear of the documents by a spring 12. The stamp may be solenoid-operated or, alternatively, the braking vacuum can be used to suck the stamp down on to the document after the document has been brought to rest. In both cases, the document is only stamped in response to a reject signal.

If the mechanism is detecting more than one type of reject, then different stamps may be provided to distinguish between them.

Figure 3:
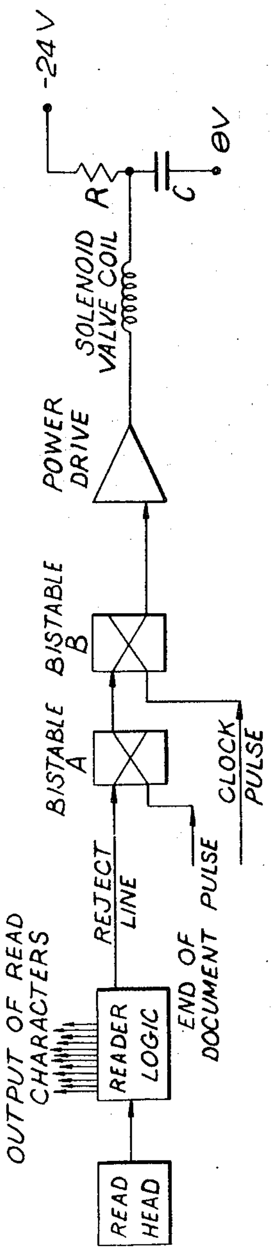
FIG. 3 is a block circuit diagram of a reject control circuit for use with the mechanism of FIGS. 1 and 2.

Referring to FIG. 3, the reject control circuit operates as follows.

As a document passes the read head, a signal is generated by the characters on the document and fed to the reader logic which decodes the signal and outputs the characters. The logic circuit also generates a reject signal if the information on the document is such that the document is to be rejected. Since it may happen that more than one reject signal is generated as the document passes the read head, the read logic feeds a first reject signal to bistable A where it is stored until an end of document pulse shifts the information to a bistable B. The resulting output switches on a power drive and thereby energizes the three-way solenoid valve admitting vacuum to the brake grooves. After a suitable delay a clock pulse resets bistable B, the power drive is switched off and the solenoid valve thus de-energized, admitting air to the brake grooves.

The circuit shows the case where rejects are being outstacked directly under the control of the reader. Alternatively all the output lines could go to a computer which would trigger the power drive either as each selected document passed the read head, or according to characteristics previously programmed into the computer.

The circuit shows an RC circuit connected to the solenoid valve, whereby the valve is initially energized at higher than its rated voltage to ensure fast movement and then dropped below rated voltage to avoid overheating.

I claim:

1. Sheet feeding apparatus including a conveyor for transferring sheets or documents one by one from a first stack along a fixed path to form a second stack, characterized in that the apparatus further includes: a braking device co-operating with said conveyor and actuable from a non-operative state to an operative state to apply a braking force to select documents moving along the said path; sensing means in the document path; a selector circuit having an input responsive to said sensing means sensing each document as it moves past a predetermined point in the said path and selectively operable to produce an output signal whenever a document is to be selected from the documents being transferred into the second stack; and an actuator energized in response to the said output signal for converting the braking device from its non-operative state to its operative state such that the selected document is brought to rest before it has been fully inserted in the second stack.

2. Apparatus according to claim 1 in which the sheets include characters characteristic of the respective sheets and the said sensing means further comprises a read head positioned at the said point for reading the said characters, the output from the read head being connected to the said input of the selector circuit.

3. Apparatus according to claim 1 in which the conveyor comprises a vented rotating vacuum drum.

4. Apparatus according to claim 3 in which the braking device comprises a vacuum brake.

5. Apparatus according to claim 4 further comprising means for applying a positive pressure to the vacuum brake in the absence of an output signal from the selector circuit.

6. Apparatus according to claim 1 further including a marking device movable into contact with the selected document in response to the said output signal before the arrival of the following document at the second stack.

7. Apparatus according to claim 6 in which the marking device comprises a stamping member resiliently biased away from the documents in the second stack.

* * * * *